United States Patent [19]
Decker

[11] Patent Number: 5,719,702
[45] Date of Patent: Feb. 17, 1998

[54] POLARIZATION-BALANCED BEAMSPLITTER

[75] Inventor: Derek E. Decker, Livermore, Calif.

[73] Assignee: The United States of America as represented by the United States Department of Energy, Washington, D.C.

[21] Appl. No.: 668,496

[22] Filed: Jun. 11, 1996

Related U.S. Application Data

[63] Continuation of Ser. No. 542,086, Oct. 12, 1995, abandoned, which is a continuation of Ser. No. 101,162, Aug. 3, 1993, abandoned.

[51] Int. Cl.$^6$ .................. G02B 5/30; G02B 27/10; G02B 27/28
[52] U.S. Cl. .................. 359/487; 359/495; 359/496; 359/497; 359/629; 359/634; 359/638
[58] Field of Search .................. 359/487, 494, 359/495, 496, 497, 583, 618, 629, 634, 636, 638, 833, 834

[56] References Cited

U.S. PATENT DOCUMENTS

| | | |
|---|---|---|
| 1,320,625 | 11/1919 | Kunz .................. 359/636 |
| 2,267,948 | 12/1941 | Rantsch .................. 359/638 |
| 3,501,640 | 3/1970 | Harris .................. 455/607 |
| 3,817,624 | 6/1974 | Martin .................. 359/638 |
| 4,309,108 | 1/1982 | Siebert .................. 359/638 |
| 4,749,259 | 6/1988 | Ledebuhr .................. 359/496 |
| 4,989,076 | 1/1991 | Owada et al. .................. 359/495 |
| 5,165,080 | 11/1992 | Healey .................. 359/636 |

OTHER PUBLICATIONS

E. C. Ho and J. A. Dobrowolski "Neutral and Color Sensitive Beam Splitting Assemblies with Polarization Independent Intensities",: *Applied Optics*, vol. 31, No. 19, 1 Jul. 1992, pp. 3813–3820.

*Primary Examiner*—Ricky D. Shafer

[57] ABSTRACT

A beamsplitter assembly that includes several beamsplitter cubes arranged to define a plurality of polarization-balanced light paths. Each polarization-balanced light path contains one or more balanced pairs of light paths, where each balanced pair of light paths includes either two transmission light paths with orthogonal polarization effects or two reflection light paths with orthogonal polarization effects. The orthogonal pairing of said transmission and reflection light paths cancels polarization effects otherwise caused by beamsplitting.

3 Claims, 7 Drawing Sheets

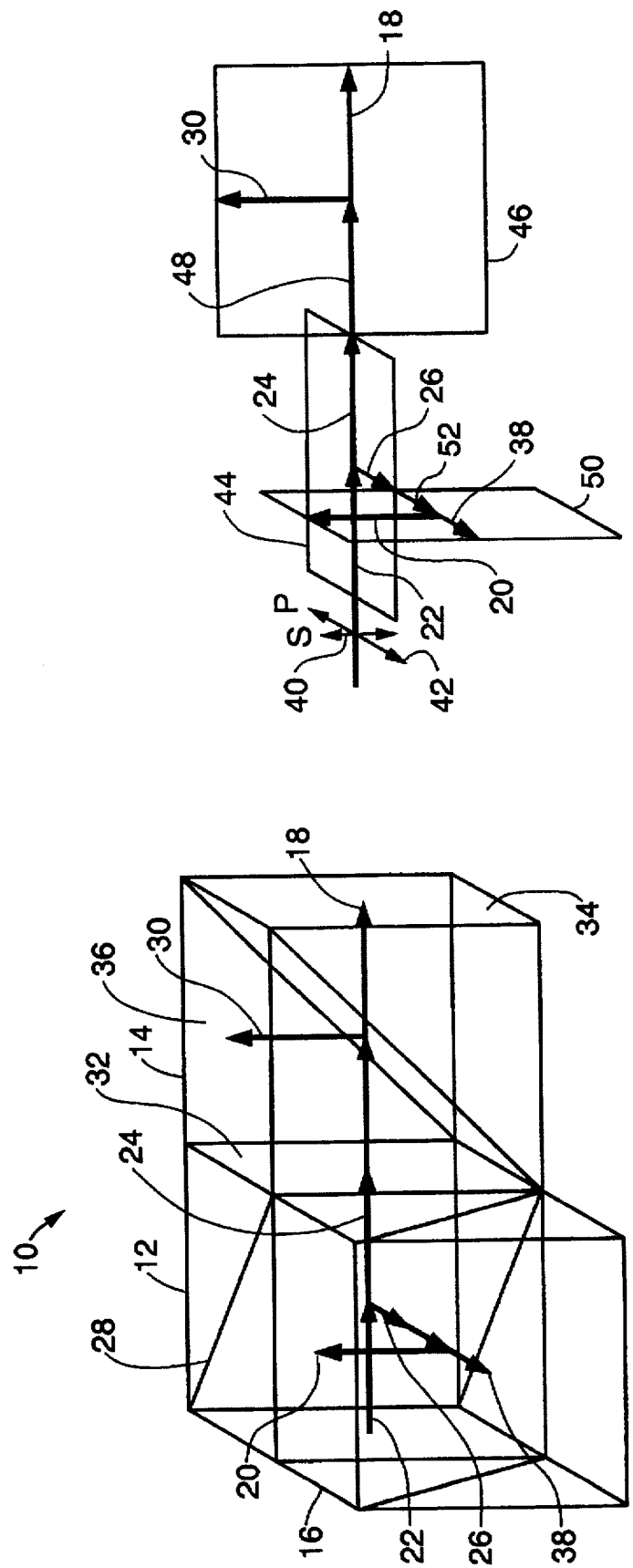

POLARIZATION-BALANCED BEAMSPLITTER

This application is a continuation of application Ser. No. 08/542,086, filed Oct. 12, 1995, now abandoned, which is a continuation of application Ser. No. 08/101,162, filed Aug. 3, 1993, now abandoned.

BACKGROUND OF THE INVENTION

1. Field of the Invention

This invention relates generally to beamsplitters for light beams, and relates more particularly to a beamsplitter device whose outputs are insensitive to polarization changes of an input beam.

2. Description of the Relevant Art

In the field of laser diagnostics, a laser or other light beam may be monitored for power level in various frequency ranges, each frequency range having a separate detector or sensor. This requires the laser beam to be split into several beams, each becoming an input to a detector or other set of diagnostic sensors. Beamsplitters may be used to divide the laser beam.

It is desirable for a power measurement to be independent of any polarization of the monitored light beam. Unfortunately, the beams output from a beamsplitter are not independent of the polarization of an incident beam. The E-vector of an incident beam can be resolved along two orthogonal axes, one perpendicular to a plane of incidence and the other parallel to the plane of incidence, which is the plane that contains the incident and reflected beams. The component of the E-vector that is perpendicular to the plane of incidence is called the s-component, while the component of the E-vector that is parallel to the plane of incidence is called the p-component.

A beamsplitter tends to polarize light. The s-component of the incident beam is reflected more effectively than it is transmitted. Conversely, the p-component of the incident beam is transmitted more effectively than it is reflected. Due to the sensitivity of a beamsplitter to polarization of the incident beam, the power levels in the transmitted and reflected beams are a function of polarization.

What is needed is a beamsplitter apparatus that outputs a plurality of beams of nearly equal power, regardless of incident beam polarization. More importantly, when diagnosing power, an output beam should not demonstrate power fluctuations if only the polarization of the input is changing.

SUMMARY OF THE INVENTION

In accordance with the illustrated preferred embodiment, the present invention provides a beamsplitter assembly that includes several beamsplitters arranged to define a plurality of polarization-balanced light paths. Each beamsplitter has a transmission light path and a reflection light path and a directional polarizing effect. The beamsplitters are arranged to define several polarization-balanced light paths, each containing one or more balanced pairs of light paths. Each balanced pair of light paths includes either two transmission light paths with orthogonal polarization effects or two reflection light paths with orthogonal polarization effects.

The orthogonal pairing of transmission and reflection light paths is the key to cancelling polarization effects. For each transmission through a beamsplitter, there is a balancing transmission where the polarization effect is orthogonal to the polarization effect of the first transmission. Also, for each reflection by a beamsplitter, there is a balancing reflection where the polarization effect is orthogonal to the polarization effect of the first reflection.

Preferably, all of the beamsplitters perform an equal 50/50 split of an incident beam into transmitted and reflected beams. Also, the beamsplitters are preferably non-polarizing beamsplitter cubes of identical construction.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a perspective diagram of three beamsplitter cubes in a second-order beamsplitter assembly according to the present invention.

FIG. 2 is a perspective diagram of planes of incidence of the three-cube, second-order beamsplitter assembly of FIG. 1.

DETAILED DESCRIPTION OF THE PREFERRED EMBODIMENTS

Figure 3:
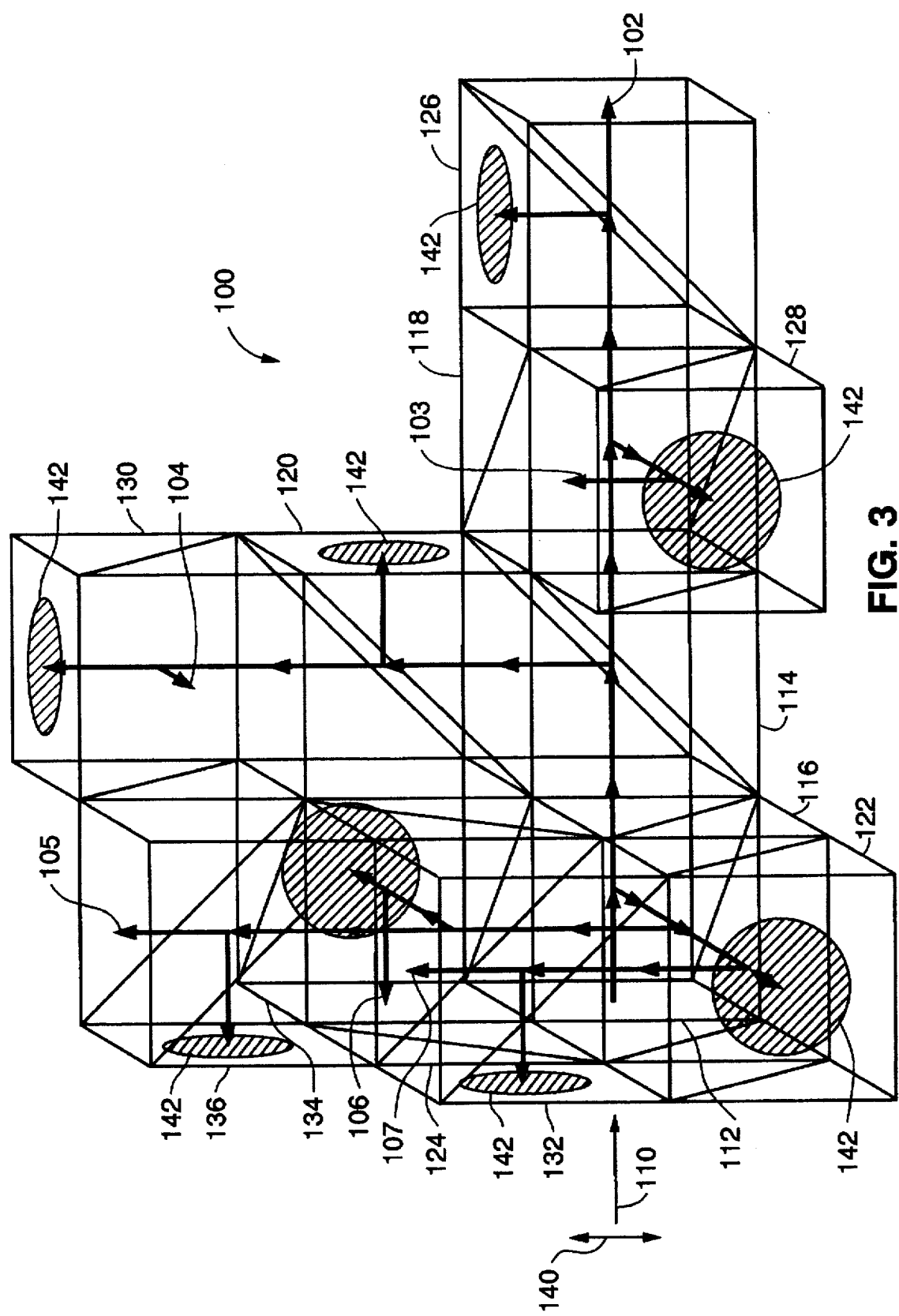
FIG. 3 is a perspective diagram of thirteen beamsplitter cubes in a fourth-order beamsplitter assembly according to the present invention.

FIGS. 1 through 10 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiment of the present invention is a beamsplitter assembly comprised of several beamsplitter cubes arranged to define a plurality of polarization-balanced light paths. First, a three-cube, second-order beamsplitter assembly with two balanced outputs will be described with respect to FIGS. 1 and 2. Then, a thirteen-cube, fourth-order beamsplitter assembly with six balanced outputs will be described with respect to FIGS. 3–10.

As shown in FIGS. 1 and 2, a three-cube, second-order beamsplitter assembly 10 includes beamsplitter cubes 12, 14, and 16, and two polarization-balanced outputs 18 and 20. Beamsplitter cube 12 is a first-order cube that receives an incident beam 22, while beamsplitter cubes 14 and 16 are second-order cubes that receive incident beams output from the first-order cube 12. Beamsplitter cube 12 receives the incident beam 22 and splits it into a transmitted beam 24 and a reflected beam 26. A partially reflective plane 28 is contained in beamsplitter cube 12, as well as the other beamsplitter cubes described herein. Preferably, all of the beamsplitters cubes are identical, non-polarizing beamsplitters that perform an approximately equal 50/50 split of an incident beam into transmitted and reflected beams.

Beamsplitter cube 14 receives the transmitted beam 24 from beamsplitter cube 12, and splits it into a transmitted beam 18 that is polarization-balanced and a reflected beam 30 that is not polarization-balanced. Beamsplitter cube 14 has a beam-entry face 32 where the incident beam enters the cube, a transmission face 34 where the transmitted beam 18 leaves the cube, and a reflection face 36 where the reflected beam 30 leaves the cube. As used herein, a "transmission" face is a face where a transmitted beam exits the cube, while a "reflection" face is a face where a reflected beam exits the cube. All of the beamsplitter cubes have comparable beam-entry, transmission, and reflection faces. Beamsplitter cube 16 receives the reflected beam 26 from beamsplitter cube 12, and splits it into a transmitted beam 38 and a reflected beam 20. Output beam 20 is polarization-balanced, while transmitted beam 38 is not polarization balanced.

Transmitted beam 18 is polarization balanced because the polarization effect of beamsplitter cube 12 on the transmitted beam 24 is balanced by an orthogonal polarization effect of beamsplitter cube 14. Transmitted beams 24 and 18 form a balanced pair of light paths. Likewise, reflected beam 20 is polarization balanced because the polarization effect of beamsplitter cube 12 on the reflected beam 26 is balanced by an orthogonal polarization effect of beamsplitter cube 16. Reflected beams 26 and 20 form a balanced pair of light paths.

Polarization balancing is illustrated in FIG. 2. Any polarization in the incident beam 22 can be resolved along two orthogonal axes, an s-component axis 40 and a p-component axis 42. The s-component axis 40 is perpendicular to an incident plane 44 of beamsplitter cube 12 and the p-component axis 42 is parallel to the incident plane 44. An incident plane is that plane which contains both an incident beam and a reflected beam; incident plane 44 contains incident beam 22 and reflected beam 26. The polarization effect of beamsplitter cube 12 is such that the s-component of the incident beam 22 is reflected more effectively than it is transmitted, and the p-component of the incident beam is transmitted more effectively than it is reflected. Consequently, the transmitted beam 24 has less s-component and more p-component than does the reflected beam 26. Transmitted beam 24 and reflected beam 26, therefore, are not polarization balanced.

Beamsplitter cubes 14 and 16 are so oriented to balance the polarization effect of beamsplitter cube 12. Beamsplitter cube 14 has an incident plane 46 that is orthogonal to the incident plane 44 of beamsplitter cube 12. The s-component of the transmitted beam 24 (along axis 40) becomes the p-component of incident beam 48 relative to beamsplitter cube 14, since the two incident planes 44 and 46 are orthogonal. Likewise, the p-component of the transmitted beam 24 (along axis 42) becomes the s-component of incident beam 48 relative to beamsplitter cube 14. Beamsplitter 14 has a balancing effect, because the transmitted output 18 has gone through two orthogonal transmissions. The second transmission in beamsplitter cube 14 is more effective along axis 40 than along axis 42, which is opposite to and balances with the effect of the first transmission in beamsplitter cube 12.

If the incident beam 22 is assumed to be polarized along the s-axis 40, then the transmitted beam 18 has undergone an s-type transmission in beamsplitter cube 12 and a p-type transmission in beamsplitter cube 14. This is denoted herein as "TsTp." The transmitted beams 24 and 18 and their associated light paths through the beamsplitter cubes 12 and 14 make up a balanced pair of transmission light paths that define a polarization-balanced light path. The reflected beam 30 of beamsplitter cube 14 is denoted "TsRp," and is not polarization-balanced.

In similar fashion, the reflected beam 20 of beamsplitter cube 16 is polarization balanced. Incident plane 50 of beamsplitter cube 16 is orthogonal to the incident plane 44 of beamsplitter cube 12. The s-component (along axis 40) of the reflected beam 26 from beamsplitter cube 12 becomes the p-component of incident beam 52 relative to beamsplitter cube 16, since the two incident planes 44 and 50 are orthogonal. Likewise, the p-component of beam 26 becomes the s-component of incident beam 52 relative to beamsplitter cube 16. Beamsplitter 16 has a balancing effect, because the reflected output 20 has gone through two orthogonal reflections. The second reflection in beamsplitter cube 16 is more effective in the p-direction than in the s-direction, which is opposite to and balances with the effect of the first reflection in beamsplitter cube 12.

If the incident beam 22 is assumed to be polarized along the s-axis 40, then the reflected beam 20 has undergone an s-type reflection in beamsplitter cube 12 and a p-type reflection in beamsplitter cube 16. This is denoted herein as "RsRp." The reflected beams 26 and 20 and their associated light paths through the beamsplitter cubes 12 and 14 make up a balanced pair of reflection light paths that define a polarization-balanced light path. The transmitted beam 38 of beamsplitter cube 16 is denoted "RsTp," and is not polarization-balanced.

A thirteen-cube, fourth-order beamsplitter assembly 100 with six balanced outputs 102–107 is illustrated in FIG. 3. Beamsplitter assembly 100 includes a first-order beamsplitter cube 112 that receives an incident light beam 110, two second-order beamsplitter cubes 114, 116 adjacent to the first-order cube, four third-order beamsplitter cubes 118, 120, 122, and 124 adjacent to the second-order cubes, and six fourth-order beamsplitter cubes 126, 128, 130, 132, 134, and 136 adjacent to the third-order cubes. Beamsplitter cubes 112, 114, and 116 correspond to beamsplitter cubes 12, 14, and 16, respectively, of FIG. 1.

If the incident beam 110 is assumed to be polarized along an s-axis 140 (relative to plane of incidence of beamsplitter cube 112), then the balanced outputs are defined as follows:

Balanced output 102 is created by an s-type transmission in beamsplitter cube 112, a p-type transmission in beamsplitter cube 114, an s-type transmission in beamsplitter cube 118, and a p-type transmission in beamsplitter cube 126. This is denoted as "TsTpTsTp." The light path of balanced output beam 102 includes two balanced pairs of transmission light paths through beamsplitters 112, 114, 118, and 126.

Balanced output 103 is created by an s-type transmission in beamsplitter cube 112, a p-type transmission in beamsplitter cube 114, an s-type reflection in beamsplitter cube 118, and a p-type reflection in beamsplitter cube 128. This is denoted as "TsTpRsRp." The light path of balanced output beam 103 includes a balanced pair of transmission light paths through beamsplitters 112 and 114, and a balanced pair of reflection light paths through beamsplitters 118 and 128.

Balanced output 104 is created by an s-type transmission in beamsplitter cube 112, a p-type reflection in beamsplitter cube 114, a p-type transmission in beamsplitter cube 120, and an s-type reflection in beamsplitter cube 130. This is denoted as "TsRpTpRs." The light path of balanced output beam 104 includes a balanced pair of transmission light paths through beamsplitters 112 and 120, and a balanced pair of reflection light paths through beamsplitters 114 and 130.

Balanced output 105 is created by an s-type reflection in beamsplitter cube 112, a p-type reflection in beamsplitter cube 116, a p-type transmission in beamsplitter cube 124, and an s-type transmission in beamsplitter cube 136. This is denoted as "RsRpTpTs." The light path of balanced output beam 105 includes a balanced pair of reflection light paths through beamsplitters 112 and 116, and a balanced pair of transmission light paths through beamsplitters 124 and 136.

Balanced output 106 is created by an s-type reflection in beamsplitter cube 112, a p-type reflection in beamsplitter cube 116, a p-type reflection in beamsplitter cube 124, and an s-type reflection in beamsplitter cube 134. This is denoted as "RsRpRpRs." The light path of balanced output beam 106 includes two balanced pairs of reflection light paths through beamsplitters 112, 116, 124, and 134.

Balanced output 107 is created by an s-type reflection in beamsplitter cube 112, a p-type transmission in beamsplitter cube 116, a p-type reflection in beamsplitter cube 122, and an s-type transmission in beamsplitter cube 132. This is denoted as "RsTpRpTs." The light path of balanced output beam 107 includes a balanced pair of reflection light paths through beamsplitters 112 and 122, and a balanced pair of transmission paths through beamsplitters 116 and 132.

In addition to the balanced outputs 102–107, the beamsplitter assembly 100 also generates outputs that are not polarization balanced. These unbalanced outputs are attenuated by absorbing beam blocks 142 applied to the appropriate faces of the beamsplitter cubes. Absorbing beam block 142 is preferably anodized aluminum.

Figure 4:
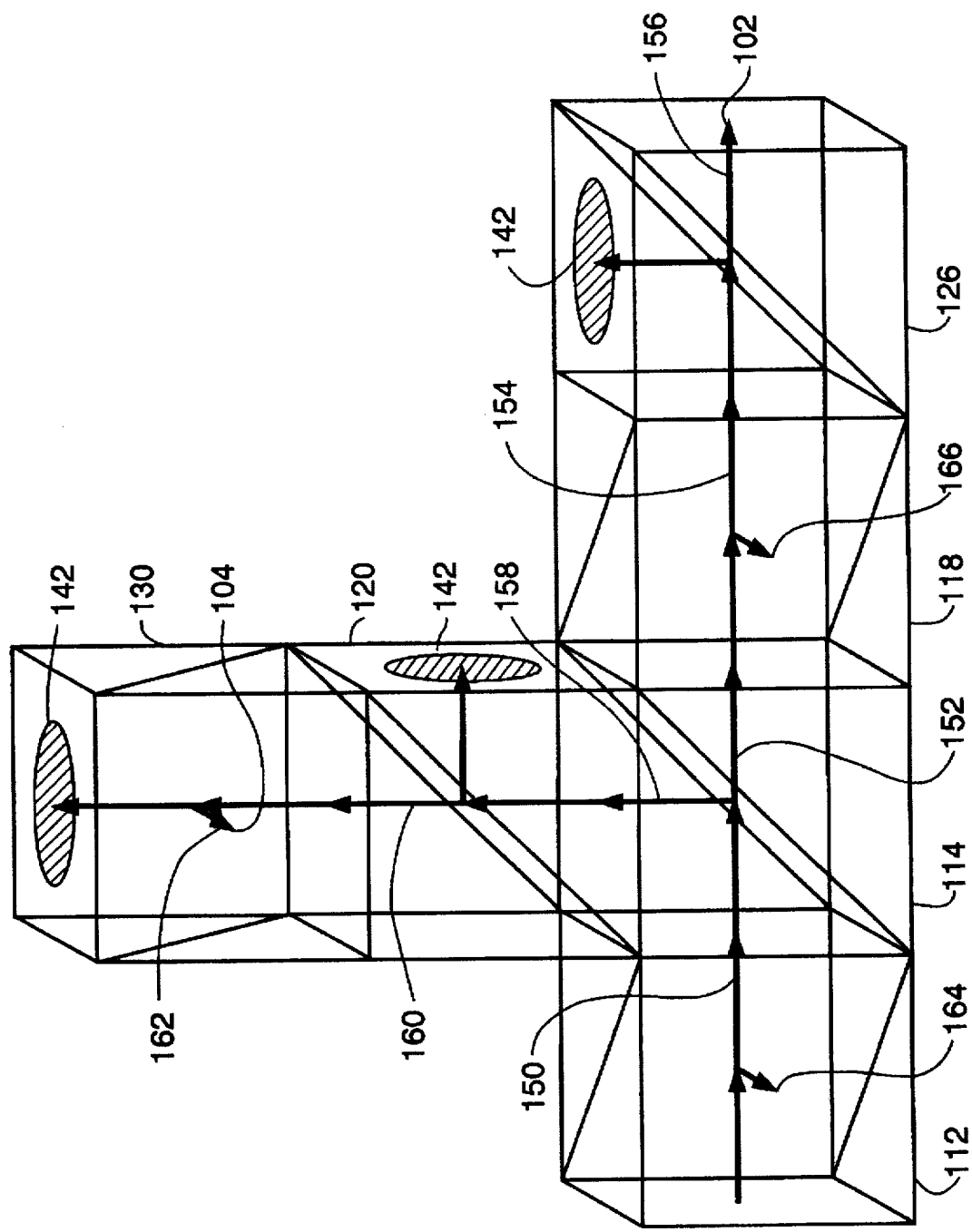
FIG. 4 is a perspective diagram of six beamsplitter cubes in a subassembly of the fourth-order beamsplitter assembly of FIG. 3.

In order to clarify the construction of the beamsplitter assembly 100, FIGS. 4–10 illustrate various subassemblies of the whole beamsplitter assembly. FIG. 4 shows the beamsplitter cubes that generate balanced outputs 102 and 104. Balanced output 102 is created by a transmission 150 through beamsplitter cube 112, a balancing transmission 152 through beamsplitter cube 114, a transmission 154 through beamsplitter cube 118, and a balancing transmission 156 through beamsplitter cube 126. The light path of balanced output beam 102 includes a balanced pair of transmission light paths through beamsplitters 112 and 114, and another balanced pair of transmission light paths through beamsplitters 118 and 126.

FIG. 4 also illustrates that balanced output 104 is created by transmission 150 through beamsplitter cube 112, a reflection 158 through beamsplitter cube 114, a balancing transmission 160 through beamsplitter cube 120, and a balancing reflection 162 through beamsplitter cube 130. The light path of balanced output beam 104 includes a balanced pair of transmission light paths through beamsplitters 112 and 120, and a balanced pair of reflection light paths through beamsplitters 114 and 130. Beams reflected from beamsplitter 126, reflected from beamsplitter 120, and transmitted by beamsplitter 130 are not balanced and are attenuated by absorbing beam blocks 142.

Figure 5:
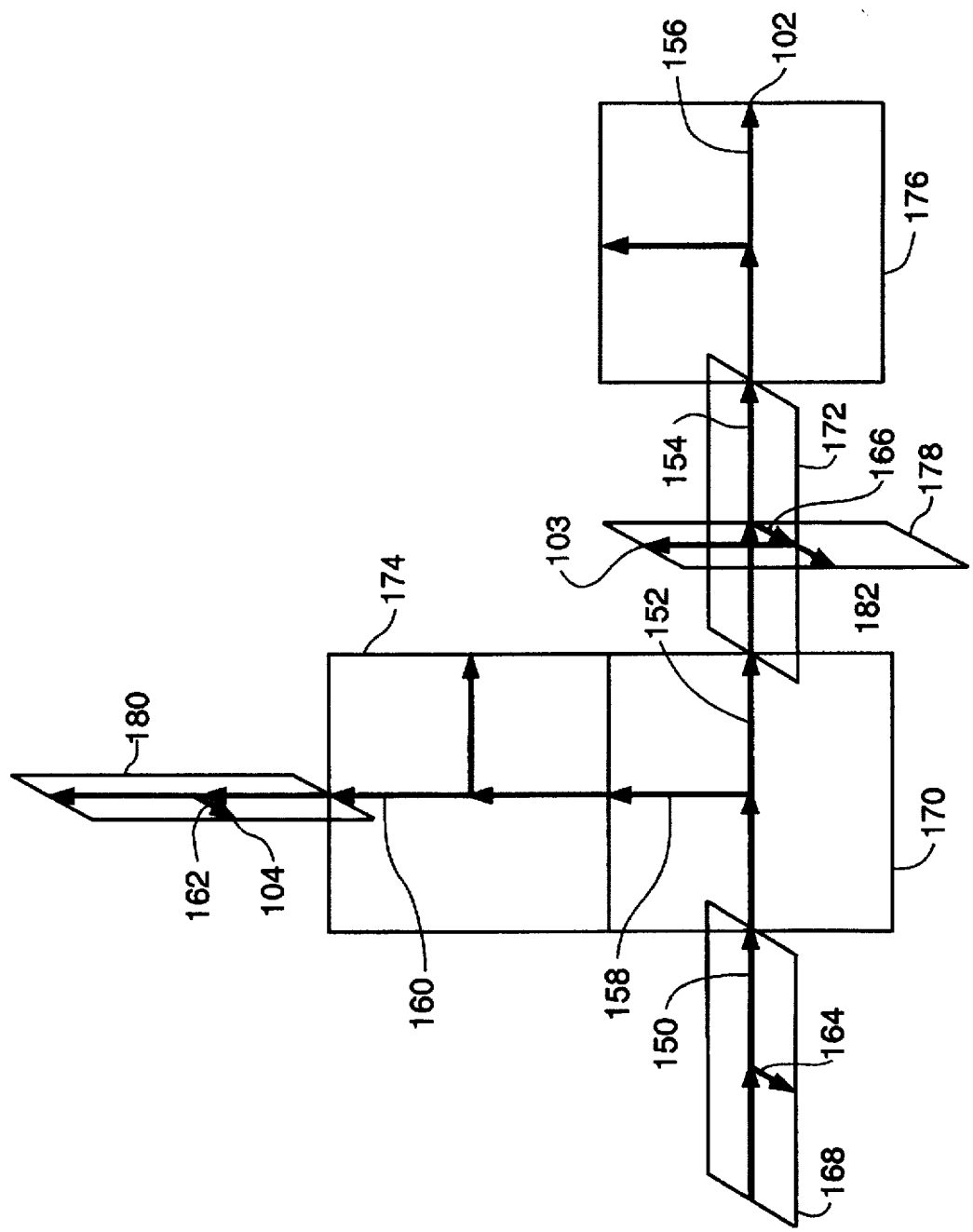
FIG. 5 is a perspective diagram of planes of incidence of the beamsplitter subassemblies of FIGS. 4 and 6.
Figure 6:
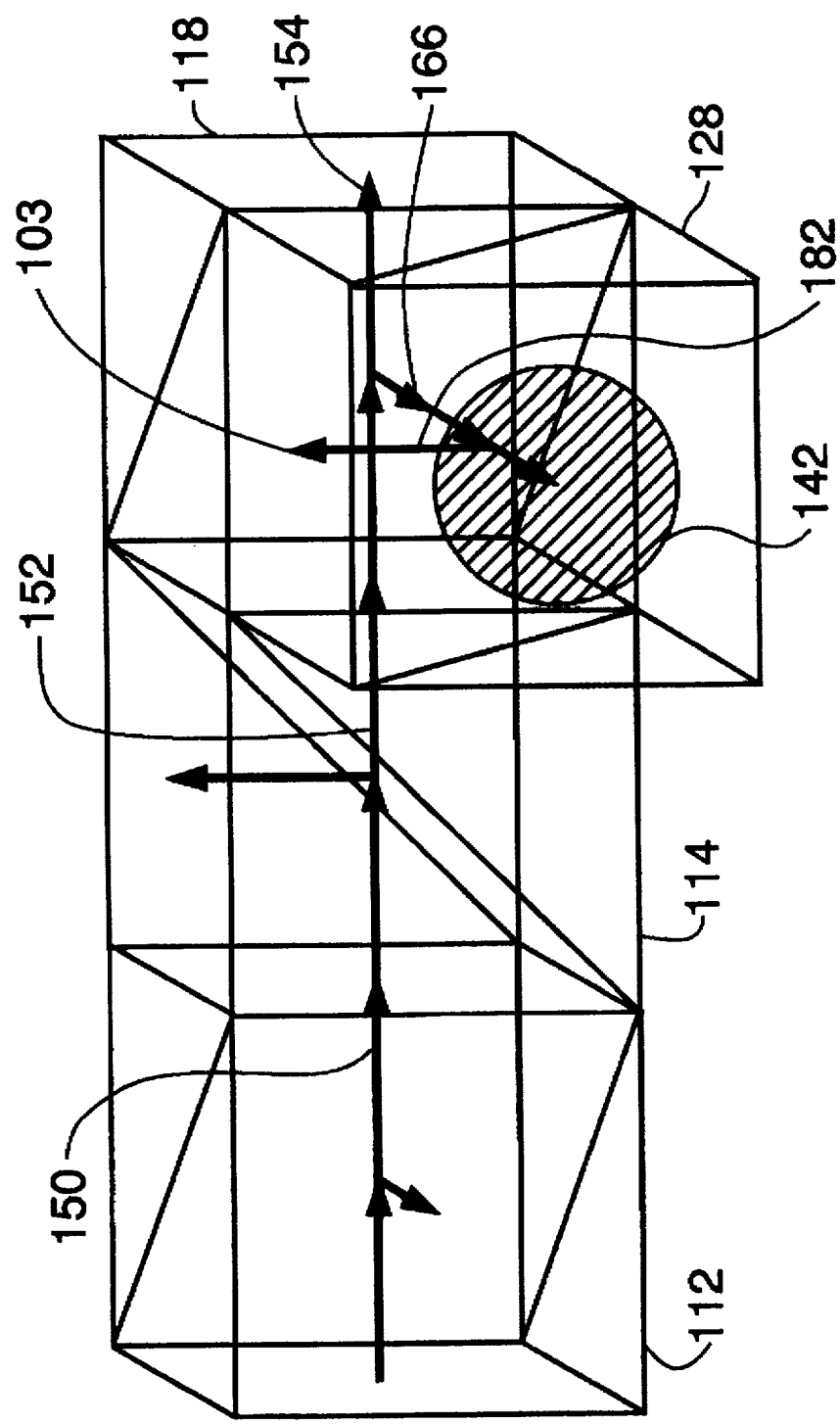
FIG. 6 is a perspective diagram of four beamsplitter cubes in a subassembly of the fourth-order beamsplitter assembly of FIG. 3.

Beamsplitter cube 118 generates a reflected beam 166 in addition to the transmitted beam 154. FIGS. 5–6 illustrate the further splitting of beam 166 into balanced output 103. Absorbing beam blocks 142 attenuate the emission of unbalanced light beams.

As shown in FIG. 5, beamsplitters 112, 114, 118, 120, 126, 128, and 130 have associated planes of incidence 168, 170, 172, 174, 176, 178, 180, respectively, each plane containing an incident beam and a reflected beam. Note that the four transmission light paths 150, 152, 154, and 156 that define balanced output beam 102 pass through two pairs of orthogonal incident planes: (168, 170) and (172, 176). As to balanced output 104, note that the incident planes 168 and 174 of the two transmission light paths 150 and 160, respectively, are orthogonal, as are the incident planes 170 and 180 of the two reflection light paths 158 and 162. Each orthogonal pair of incident planes balances the polarizing effects of the beamsplitters.

The beamsplitters that create balanced output 103 are illustrated in FIG. 6. Balanced output 103 is created by a transmission 150 through beamsplitter cube 112, a balancing transmission 152 through beamsplitter cube 114, a reflection 166 through beamsplitter cube 118, and a balancing reflection 182 through beamsplitter cube 128. The light path of balanced output beam 103 includes a balanced pair of transmission light paths 150 and 152 through beamsplitters 112 and 114, and a balanced pair 166 and 182 of reflection light paths through beamsplitters 118 and 128. A beam transmitted through beamsplitter 128 is not balanced and is attenuated by absorbing beam block 142. As shown in FIG. 5, the incident planes 168 and 170 of the transmission light paths 150 and 152 are orthogonal, and the incident planes 172 and 178 of the reflection light paths 166 and 182 are orthogonal.

Beamsplitter cube 112 generates a reflected beam 164 in addition to the transmitted beam 150. FIGS. 7–10, described below, illustrate the further splitting of reflected beam 164 into balanced outputs 105–107.

Figure 8:
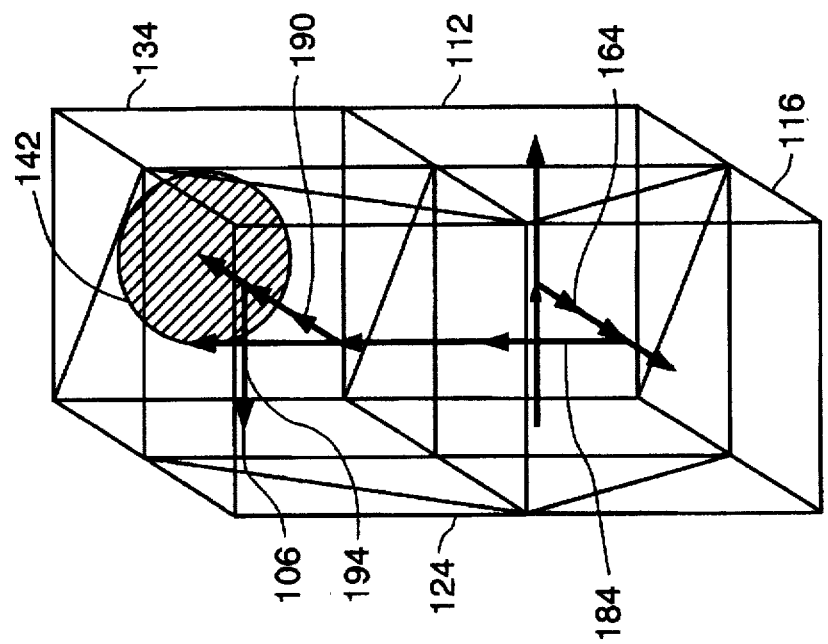
FIG. 8 is a perspective diagram of four beamsplitter cubes in a subassembly of the fourth-order beamsplitter assembly of FIG. 3.
Figure 7:
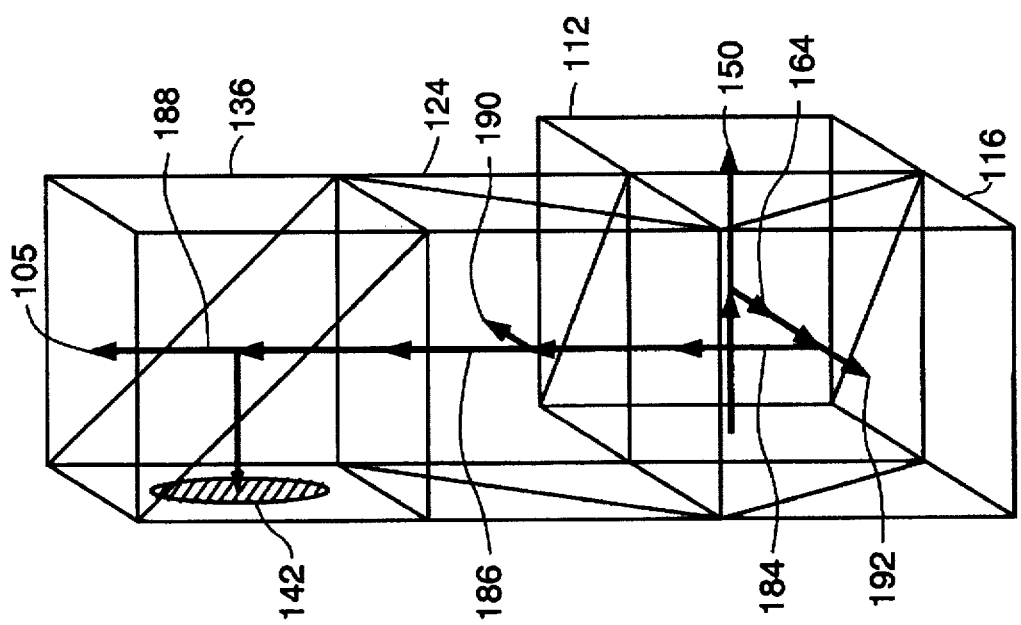
FIG. 7 is a perspective diagram of four beamsplitter cubes in a subassembly of the fourth-order beamsplitter assembly of FIG. 3.
Figure 9:
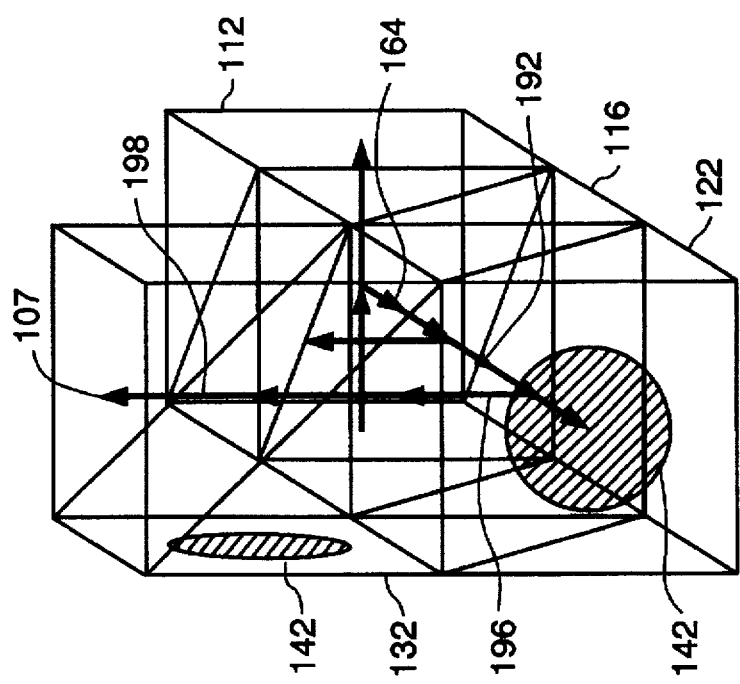
FIG. 9 is a perspective diagram of four beamsplitter cubes in a subassembly of the fourth-order beamsplitter assembly of FIG. 3.

The beamsplitters that create balanced output 105 are illustrated in FIG. 7. Balanced output 105 is created by a reflection 164 through beamsplitter cube 112, a balancing reflection 184 through beamsplitter cube 116, a transmission 186 through beamsplitter cube 124, and a balancing transmission 188 through beamsplitter cube 136. The light path of balanced output beam 105 includes a balanced pair of reflection light paths 164 and 184 through beamsplitters 112 and 116, and a balanced pair of transmission light paths 186 and 188 through beamsplitters 124 and 136. Beamsplitter 124 also generates a reflection 190, which is used to generate balanced output 106, as shown in FIG. 8. Beamsplitter 116 also generates a transmission 192, which is used to generate balanced output 107, as shown in FIG. 9. A beam reflected from beamsplitter 136 is not balanced and is attenuated by absorbing beam block 142.

The beamsplitters that create balanced output 106 are illustrated in FIG. 8. Balanced output 106 is created by a reflection 164 through beamsplitter cube 112, a balancing reflection 184 through beamsplitter cube 116, a reflection 190 through beamsplitter cube 124, and a balancing reflection 194 through beamsplitter cube 134. The light path of balanced output beam 106 includes a balanced pair of reflection light paths 164 and 184 through beamsplitters 112 and 116 and another balanced pair of reflection light paths 190 and 194 through beamsplitters 124 and 134. A beam transmitted through beamsplitter 134 is not balanced and is attenuated by absorbing beam block 142.

The beamsplitters that create balanced output 107 are illustrated in FIG. 9. Balanced output 107 is created by a reflection 164 through beamsplitter cube 112, a transmission 192 through beamsplitter cube 116, a balancing reflection 196 through beamsplitter cube 122, and a balancing transmission 198 through beamsplitter cube 132. The light path of balanced output beam 107 includes a balanced pair of reflection light paths 164 and 196 through beamsplitters 112 and 122, and a balanced pair of transmission paths 192 and 198 through beamsplitters 116 and 132. A beam transmitted through beamsplitter cube 122 and a beam reflected by beamsplitter cube 132 are not balanced and are attenuated by absorbing beam blocks 142.

Figure 10:
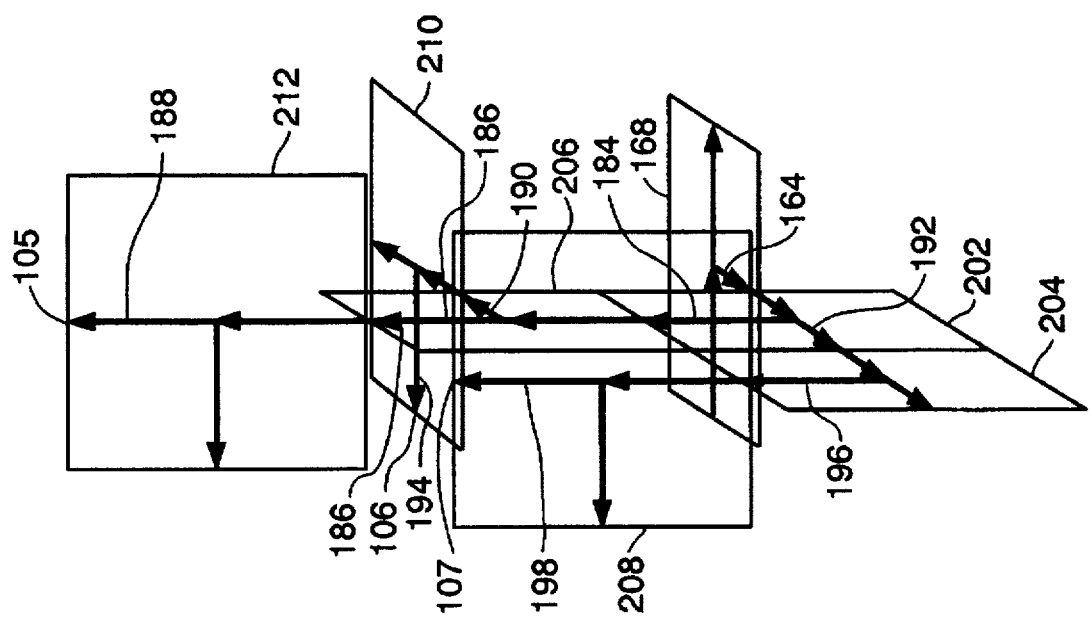
FIG. 10 is a perspective diagram of planes of incidence of the beamsplitter subassemblies of FIGS. 7, 8, and 9.

FIG. 10 illustrates the incident planes for the beamsplitter cubes that generate balanced outputs 105, 106, and 107. As shown in FIG. 10, beamsplitter cubes 112, 116, 122, 124, 132, 134, and 136 have associated planes of incidence 168, 202, 204, 206, 208, 210, and 212, respectively, where each plane is defined by an incident beam and a reflected beam. In generating balanced output 105, the incident planes 168 and 202 of the two reflection light paths 164 and 184, respectively, are orthogonal, as are the incident planes 206 and 212 of the two transmission light paths 186 and 188. The four reflection light paths 164, 184, 190, and 194 that define balanced output beam 106 pass through two pairs of orthogonal incident planes: (168, 202) and (206, 210). As to balanced output 107, note that the incident planes 168 and 204 of the two reflection light paths 164 and 196, respectively, are orthogonal, as are the incident planes 202 and 208 of the two transmission light paths 192 and 198. Each orthogonal pair of incident planes balances the polarizing effects of the beamsplitter cubes.

The thirteen cube configuration of FIGS. 3–10 is especially efficient in creating six balanced outputs with a minimum number of beamsplitters and a minimum loss of power. If the three-cube configuration of FIGS. 1–2 were used as a basic building block, then a four output assembly could be constructed from nine cubes, with each output passing through four cubes. To obtain six polarization-balanced outputs, one could add two more three-cube configurations to two of the balanced outputs of the nine-cube configuration for a total of fifteen cubes. Such a fifteen-cube configuration would have two balanced outputs passing through four cubes and four balanced outputs passing through six cubes. Such a configuration is less desirable than the thirteen cube configuration of FIGS. 3–10 because more cubes are needed and because the power of four of the outputs is further attenuated.

From the above description, it will be apparent that the invention disclosed herein provides a novel and advantageous beamsplitter assembly that creates a plurality of polarization-balanced light paths. The foregoing discussion discloses and describes merely exemplary embodiments of the present invention. As will be understood by those familiar with the art, the invention may be embodied in other specific forms without departing from the spirit or essential characteristics thereof.

The particular orientations of the beamsplitter cubes described herein could be changed, so long as the polarization cancellation effects described herein are maintained. For example, certain cubes such as cube 16 (FIG. 1) could be turned upside-down so that balanced output 20 exits downward instead of upward. As another example, the "RsRpRpRs" orientation of the beamsplitters that produces balanced output 106 (FIG. 8) could be reconfigured as any of the following orientations: "RsRpRsRp," "RsRsRpRp," "RpRsRpRs," "RpRsRsRp," or "RpRpRsRs." Furthermore, sixth-order or eighth-order beamsplitter assemblies could be constructed using the principles disclosed herein to provide more outputs. Non-polarizing or partially polarizing beamsplitters can be used. The outputs need not be equal, and it is contemplated that unequal outputs could be obtained by using partially polarizing beamsplitters, or different numbers of balancing pairs of beamsplitters, or reflectances other than the 50% reflectance beamsplitters disclosed herein.

Accordingly, the disclosure of the present invention is intended to be illustrative, but not limiting, of the scope of the invention, which is set forth in the following claims.

What is claimed is:

1. A polarization-balanced beamsplitter assembly for providing six polarization-balanced output beams from a single input light beam independent of the polarization state of the input light beam, wherein any polarization in said input beam is resolvable along an s-component axis and a p-component axis, wherein said s-component axis defines an s-component polarization and said p-component axis defines a p-component polarization, wherein said s-component axis is orthogonal to said p-component axis, the assembly comprising:

thirteen beamsplitter cubes arranged to provide said six polarization-balanced output beams, each cube containing a partially reflective surface, wherein a light beam incident on said partially reflective surface is split into a transmitted light beam and a reflected light beam, wherein said transmitted light beam contains a first portion of said s-component polarization and a first portion of said p-component polarization, wherein said reflected light beam contains a second portion of said s-component polarization and a second portion of said p-component polarization, wherein each cube contains a plane of incidence defined by the incident light beam and the reflected light beam, wherein each of said six polarization-balanced output beams pass through two pairs of polarization-balanced beamsplitter cubes selected from said thirteen beamsplitter cubes, wherein each of said pairs of polarization-balanced beamsplitter cubes have orthogonal planes of incidence relative to the incident light beam, and wherein a light beam passing through each of said pairs of polarization-balanced beamsplitter cubes is either transmitted by both polarization-balanced beamsplitter cubes or reflected by both polarization-balanced beam splitter cubes.

2. The beamsplitter assembly as recited in claim 1, wherein said beamsplitter cubes are 50 percent beamsplitter cubes.

3. The beamsplitter assembly as recited in claim 1, wherein said six polarization-balanced output beams are of equal intensity.

* * * * *